US010843833B2

(12) United States Patent
Ternes et al.

(10) Patent No.: US 10,843,833 B2
(45) Date of Patent: Nov. 24, 2020

(54) DEVICE FOR SEALING A PACKAGING

(71) Applicant: Robert Bosch GmbH, Stuttgart (DE)

(72) Inventors: David Ternes, Stuttgart (DE); Marcel Egli, Thayngen (CH); Rolf Steinemann, Neuhausen (CH); Ulrich Wieduwilt, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 182 days.

(21) Appl. No.: 15/961,496

(22) Filed: Apr. 24, 2018

(65) Prior Publication Data
US 2018/0312284 A1 Nov. 1, 2018

(30) Foreign Application Priority Data

Apr. 28, 2017 (DE) .................... 10 2017 207 247

(51) Int. Cl.
*B29C 65/36* (2006.01)
*B65B 51/22* (2006.01)
(Continued)

(52) U.S. Cl.
CPC .......... *B65B 51/227* (2013.01); *B29C 65/368* (2013.01); *B29C 65/3656* (2013.01); *B29C 65/3668* (2013.01); *B29C 66/133* (2013.01); *B29C 66/4322* (2013.01); *B29C 66/72321* (2013.01); *B29C 66/81465* (2013.01); *B29C 66/83413* (2013.01); *B29C 66/849* (2013.01); *B65B 9/067* (2013.01); *B65B 9/087* (2013.01); *B65B 11/105* (2013.01); *B65B 11/12* (2013.01); *B65B 51/26* (2013.01); *B29C 65/74* (2013.01); *B29C 66/4312* (2013.01); *B29C 66/83221* (2013.01); *B29L 2031/7128* (2013.01);
(Continued)

(58) Field of Classification Search
CPC .... B29C 65/36; B29C 65/3656; B65B 51/227
USPC ...................................................... 51/373.7
See application file for complete search history.

(56) References Cited

U.S. PATENT DOCUMENTS 5,319,173 A * 6/1994 McGaffigan ........ B29C 61/0625
219/634
6,732,496 B1 * 5/2004 Wessman ........... B29C 66/91313
53/479
(Continued)

FOREIGN PATENT DOCUMENTS

WO 02060759 8/2002

OTHER PUBLICATIONS

International Search Report for Application No. PCT/EP2016/068498 dated Oct. 25, 2016 (English Translation, 2 pages).

*Primary Examiner* — Chelsea E Stinson
(74) *Attorney, Agent, or Firm* — Michael Best & Friedrich LLP

(57) ABSTRACT

The present invention relates to a device for sealing a packaging material (10), comprising at least one sealing installation (18) which comprises at least one coil core (24) which is surrounded by at least one coil (25), wherein the coil core (24) has at least one gap (32) through which packaging material peripheries (34, 36) to be sealed are guided, wherein at least one element (23) that conducts a magnetic flux is provided, said element (23) for influencing a region (22) of the packaging material peripheries (34, 36) to be heated being disposed so as to be adjacent to the packaging material peripheries (34, 36) to be sealed.

30 Claims, 4 Drawing Sheets

(51) Int. Cl.
  *B65B 11/10* (2006.01)
  *B65B 11/12* (2006.01)
  *B65B 51/26* (2006.01)
  *B65B 9/087* (2012.01)
  *B65B 9/067* (2012.01)
  *B29C 65/00* (2006.01)
  *B65D 75/12* (2006.01)
  *B65D 75/46* (2006.01)
  *B29L 31/00* (2006.01)
  *B29C 65/74* (2006.01)

(52) U.S. Cl.
  CPC .......... *B65B 2220/08* (2013.01); *B65D 75/12* (2013.01); *B65D 75/46* (2013.01)

(56) References Cited

U.S. PATENT DOCUMENTS 6,894,256 B2 * 5/2005 Balla .................. B29C 65/3656
                                                         156/379.6
2018/0250888 A1 * 9/2018 Mach ................ B29C 66/81811

* cited by examiner

DEVICE FOR SEALING A PACKAGING

BACKGROUND OF THE INVENTION

The present invention relates to a device for sealing a packaging.

A device of the generic type is known, for example, from WO 2002/060759. This device includes a coil that is connectable to a high-frequency current source, the core of said coil being composed from a ferromagnetic conducting material. The core has two ducts having an air gap. The coil which is formed by metal strips having a specific geometry is wound around an arcuate portion that connects the ducts.

The invention is based on the object of further improving the quality of the seal seam.

SUMMARY OF THE INVENTION

As opposed to the above, the device according to the invention, has the advantage that the quality of the seal seam is improved. By virtue of the element that conducts a magnetic flux it becomes possible for a clearly defined region of the packaging material to be heated. On account thereof, sealing of a continuously moving packaging material web can also be performed. The location of the sealing can be chosen in a targeted manner such that said location does not lie directly on the periphery of the packaging material, on the one hand, but has a safe distance from the heat-sensitive product to be packed, on the other hand. On account thereof, damage to the product can be prevented.

In one expedient refinement, the element, preferably on both sides, at least partially surrounds the packaging material peripheries to be sealed. To this end, the element particularly preferably has a recess. On account of this arrangement, the region to be heated can be focused in a particularly targeted manner such that a maximum heat input is influenced not at the packaging material peripheries but so as to be somewhat spaced apart from the latter.

In one expedient refinement, the element that conducts the magnetic flux is at least partially enclosed by the coil core. To this end, the coil core particularly preferably has an interior space in which the element is disposed. On account thereof, a space-saving arrangement which at the same time is protected from environmental influences is guaranteed.

In one expedient refinement, the recess of the element is disposed so as to be aligned with the gap in the magnet core through which the packaging material peripheries to be sealed are guided. On account of this symmetrical arrangement, the magnetic field can be directed onto both packaging material peripheries in the same manner such that uniform heating takes place in the desired regions, in particular so as to be spaced apart from the peripheries.

In one expedient refinement, the element is disposed so as to be movable relative to the coil core. The flexibility of the arrangement is increased on account thereof, since the region to be heated now can be readily modified. The same sealing installation can thus be used for dissimilar packaging material types or geometries.

The element is particularly expediently configured so as to be U-shaped, in particular having a recess having a height in the range between 10 and 20 mm and/or a width of 5 to 10 mm. This arrangement is easy to produce and nevertheless very suitable for sealing commonplace packaging materials. The heating profile is specifically influenced in a targeted manner by focusing the field profile onto the desired regions. The additional element, besides influencing the heating profile by way of influencing the field, also serves for guiding the packaging material region to be heated.

In one expedient refinement, the element is composed of a ferromagnetic material, said element in particularly containing or being composed of manganese and/or zinc. Particularly positive results in terms of the desired heat input can thus be achieved.

In one expedient refinement, a drive installation which mutually compresses the two packaging material peripheries is provided. Particularly solid sealing is thus enabled.

Further expedient refinements are derived from further dependent claims and from the description.

BRIEF DESCRIPTION OF THE DRAWINGS

An exemplary embodiment of the invention will be described in detail hereunder with reference to the accompanying drawing. In the drawing.

DETAILED DESCRIPTION

Figure 1:
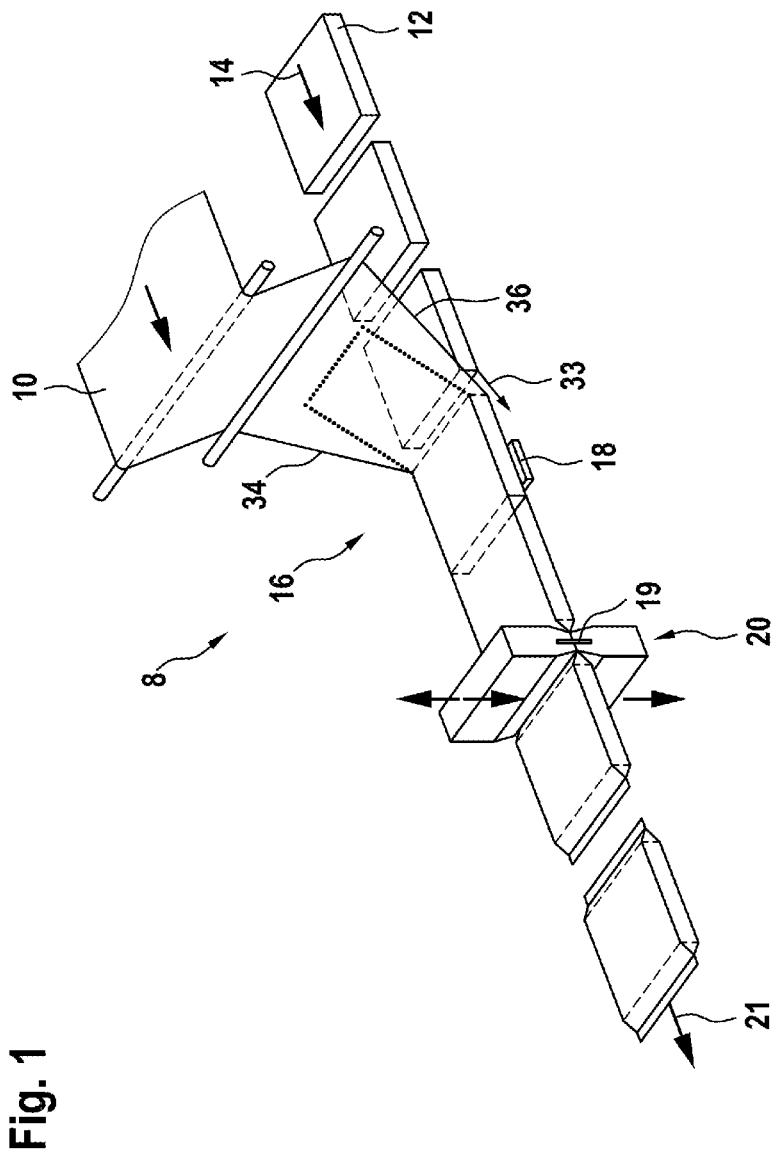
FIG. 1 shows a perspective view of a packaging machine.

A packaging machine 8 comprises, for example, a packaging material roll onto which the packaging material 10 to be processed is rolled. The packaging machine 8 can be embodied, for example, as a tubular bag machine. The exemplary embodiment shown in FIG. 1 is a horizontal tubular bag machine in the case of which the products 12 to be packaged are horizontally fed by way of an infeed 14. Alternatively, vertical tubular bag forming, filling, and sealing machines in which the products to be packaged, often free-flowing products, are fed to the packaging material tube from above, could also be used. Further packaging machines 8 in which sealing installations 18 are provided for connecting two packaging material peripheries 34, 36 of a packaging material 10 are also conceivable.

The packaging material 10 comes above the products 12 to a forming installation 16. The forming installation 16 forms the packaging material 10 so as to form a packaging material tube. The forming installation 16 to this end gathers the two packaging material peripheries 34, 36 of the packaging material 10 around the product 12 to be packaged. The longitudinal seam is subsequently configured in a sealing installation 18 in that the packaging material peripheries 34, 36 are interconnected. For example, the longitudinal seam can be configured as a fin seal, as can be seen in more detail in FIGS. 2 and 3. Respective infeed means 33 which feed the packaging material peripheries 34, 36 to the sealing installation 18 are configured. This can be performed by correspondingly driven rollers and guides. The infeed means 33 serve in particular for feeding the packaging material peripheries 34, 36 to a gap 32 of a core 24 of a coil 25, as will yet be set forth in more detail in the context of FIGS. 2 and 3. Respective contact pressure installations 54 (cf. FIG. 5) which for sealing mutually compress the two packaging material peripheries 34, 36 after heating can likewise be provided.

Once the sealing installation 18 has formed the longitudinal seam of the packaging material tube, the latter together with the sheathed products 12 reaches a transverse sealing installation 20. The transverse sealing installation 20 comprises two sealing jaws which are movable relative to one another and which form the transverse seam of the packaging material tube and simultaneously, by way of a separation means 19 that is integrated in the sealing jaws, sever the packages having the packed products 12 from the continuous packaging material tube. A dispensing installation 21, indicated by an arrow, follows on from the transverse sealing installation 20.

Figure 2:
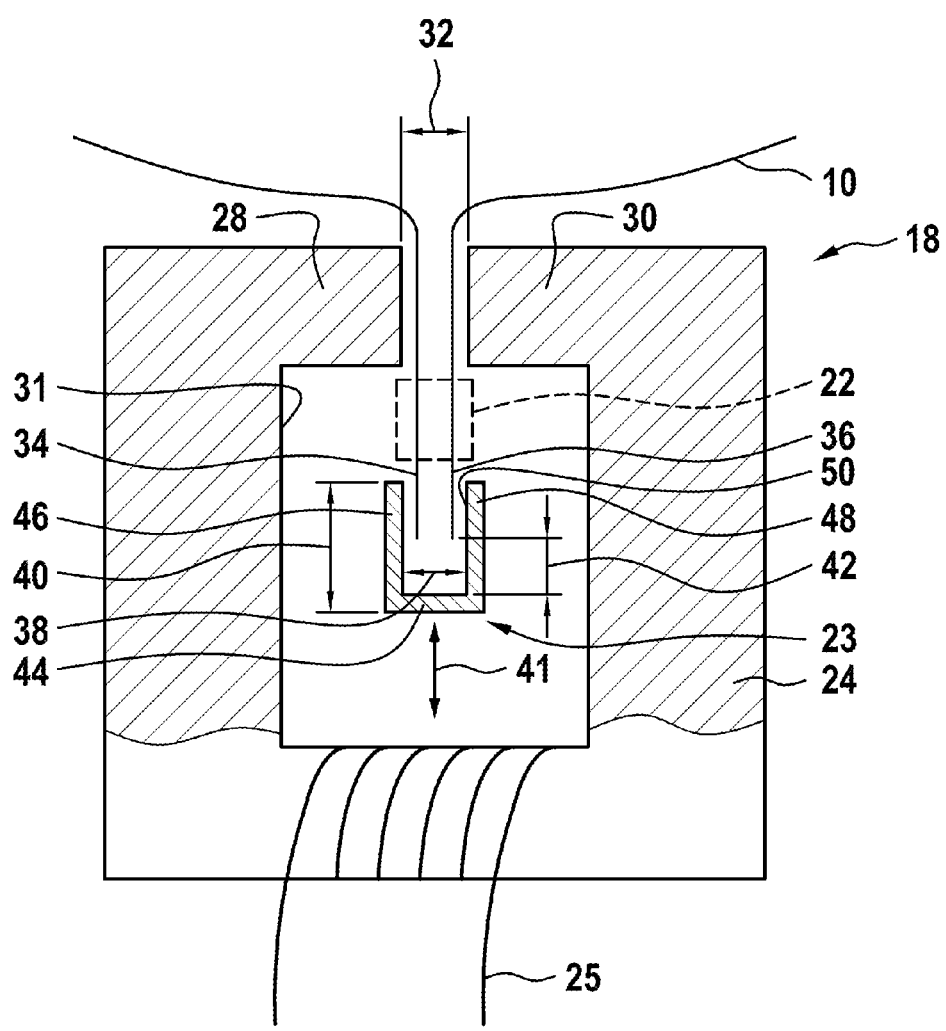
FIG. 2 shows a sealing installation of a first exemplary embodiment in the cross-section.

A first exemplary embodiment of a sealing installation 18 is illustrated in FIG. 2. The two packaging material peripheries 34, 36 of the packaging material 10 to be sealed make their way into a gap 32 of the sealing installation 18. The gap 32 is formed by two legs 28, 32 of a coil core 24. The coil core 24 is configured so as to be U-shaped. A coil 25 is wound around the part of the coil core 24 that connects the two legs 28, 30. The interior space 31 of the coil core 24 that is formed by the legs 28, 30 and the connecting part is configured so as to have a substantially rectangular cross section. At least one element 23 that conducts a magnetic flux is located in the interior space 31. The element 23 that conducts a magnetic flux is configured, for example, so as to be U-shaped. The element 23 comprises two legs 46, 48 which are interconnected by a lower side 44. A recess 50 is formed on account thereof. That side of the element 23 that is open at the top is oriented in the direction of the gap 32, in particular so as to be aligned with the gap 32. The packaging material peripheries 34, 36 moreover protrude into the recess 50 of the element 23. The legs 46, 48 of the element 23 that conducts a magnetic flux have a height 40, the lower side 44 having a width 38. The ends of the packaging material peripheries 34, 36 have a spacing 42 from the lower side 44 of the ferromagnetic element 23. On account of the geometric configuration of the arrangement of the element 23 within the coil core 24, a region 22 of maximum heating which is spaced apart from the ends of the packaging material peripheries 36, 38 is defined at the overlapping packaging material peripheries 34, 36. The region 22 is moreover spaced apart from the internal side of the packaging that is formed after sealing, is thus disposed so as to be remote from the product 12 to be packaged. As is indicated by the double arrow 41, the ferromagnetic element 23 can move relative to the ends of the packaging material peripheries 34, 36. A respective adjustment installation 41 is provided to this end.

Figure 3:
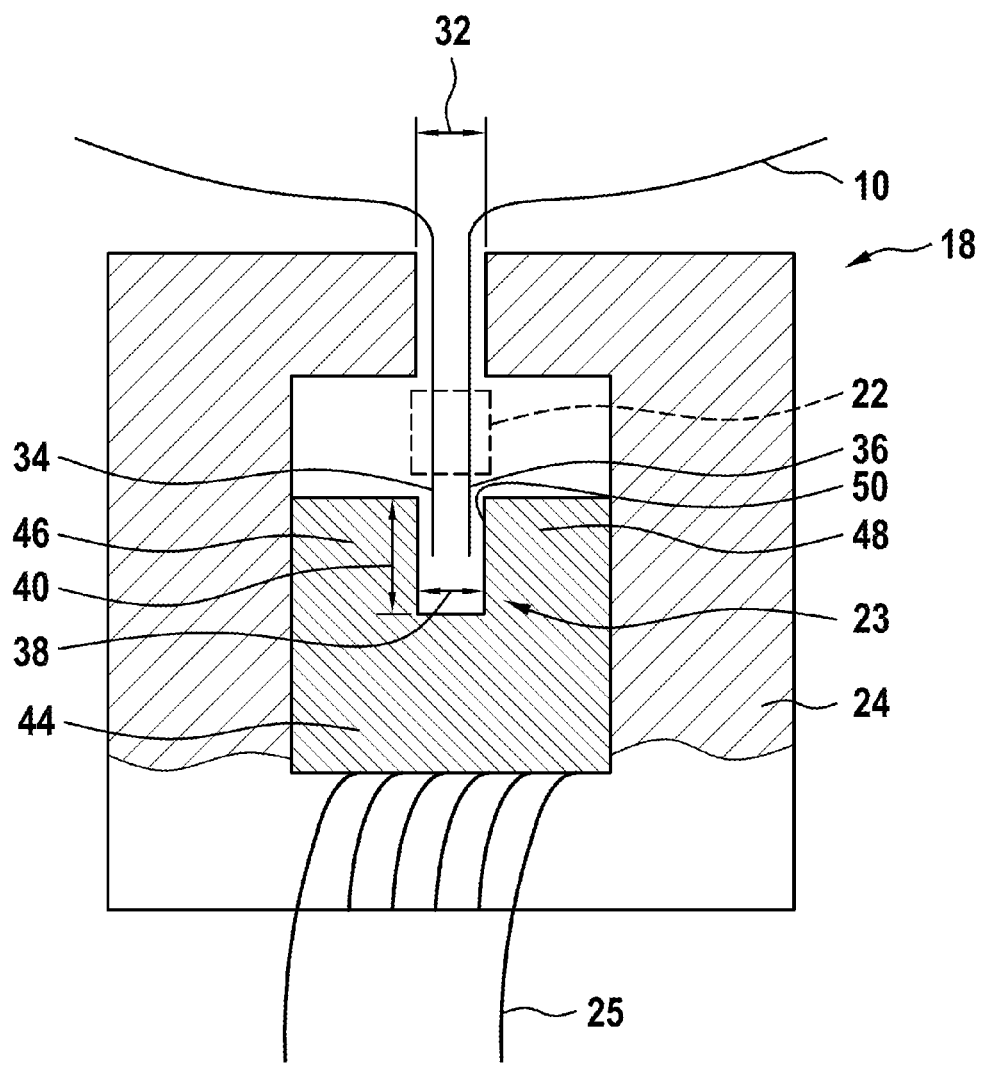
FIG. 3 shows a sealing installation of a further exemplary embodiment in the cross-section.

The exemplary embodiment according to FIG. 3 differs from that of FIG. 2 by way of a modified design embodiment of the element 23 that conducts a magnetic flux. On the one hand, the element 23 by way of the two legs 46, 48 is disposed so as to be flush with the internal sides of the legs 28, 30 of the coil core 24. The recess 50 of the element 23 again has a width 38 and a height 40 corresponding substantially to the dimensions of the exemplary embodiment of FIG. 2. The recess 50 of the element 23 is again oriented such that the ends of the packaging material peripheries 34, 36 are at least partially received in the recess 50. The opening of the clearance 50 is again oriented in the direction of the gap 32.

Figure 4:
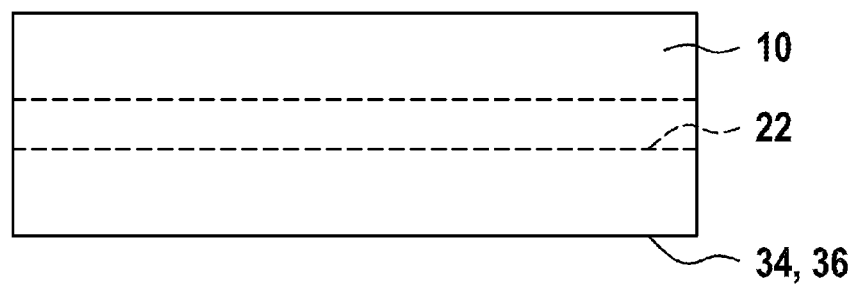
FIG. 4 shows a plan view of a packaging material with the region of maximum heating.

The definition of the region 22 having maximum heating is shown in FIG. 4 in the plan view of the packaging material 10. As has already been set forth, the region 22 is spaced apart from the respective packaging material periphery 34, 36, on the one hand, and spaced apart from that region that in the packaged state comes into contact with the product 10, on the other hand. The spacing between the packaging material periphery 34, 36 and the start of the region 22 having maximum heating is particularly preferably in a range between 5 mm and 20 mm.

Figure 5:
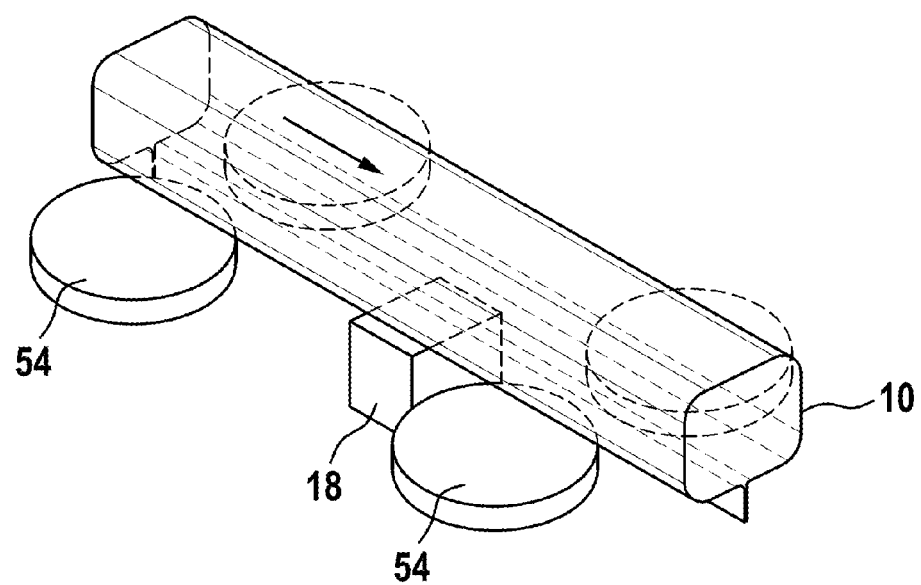
FIG. 5 shows a perspective view of a sealing installation having contact pressure installations that are configured as drawing-off rollers.

In the perspective view according to FIG. 5, the packaging material tube that is formed from the packaging material 10 for sealing the longitudinal seam is in this region compressed by drawing-off rollers 54 and thus positioned in the desired manner ahead of the sealing installation 18 and fed to the latter. In each case two drawing-off rollers 54 herein are disposed so as to be mutually opposite such that both ends of the packaging material 10 are joined and compressed. The joined region is subsequently fed to the sealing installation 18. Yet a further pair of drawing-off rollers 54 is provided thereafter in the exemplary embodiment. On account thereof, the packaging material peripheries sealed by the sealing installation 18 are compressed at the desired pressure. A solid and tight sealing is created on account thereof. These drawing-off rollers 54 are one potential embodiment of a contact pressure installation 54. The contact pressure installation 54 is preferably disposed so as to directly adjoin the sealing installation 18.

The sealing installation 18 operates as an induction sealing installation. To this end, the coil 25 in a known manner is connected to a high-frequency current source such that heat is generated in the packaging material 10 to be sealed. To this end, the packing material is composed, for example, of at least one conductive layer and one polymer layer. The packing material could thus comprise, for example, an aluminum layer. A magnetic field which is propagated by the magnetic flux in the coil core 24 is created when the coils 25 are energized. The magnetic circuit is closed by way of the gap 32. The additional element 23 that conducts a magnetic flux influences the field profile of the magnetic field generated by the coil 25 and thus the heating of the packaging material peripheries 34, 36 to be fused.

The element 23 serves for focusing the heat input in the desired region of the packaging material peripheries 34, 36, as is shown in FIG. 4. Relevant herein are the material properties of the element 23, on the one hand, as well as the position relative to the active area of the inductor, thus the air gap 32 of the coil core 24. The element 23 is composed of a ferromagnetic material. Said element 23 thus conducts the magnetic flux, or the magnetic field, respectively, in a targeted manner. The ferromagnetic material of the element 23 preferably includes or is composed of manganese and/or zinc.

The geometry of the element 23 that conducts a magnetic flux for guiding the field is chosen such, for example, that the height 40 is in a range between 10 mm and 20 mm. The width 38 is preferably in a range between 5 mm and 10 mm. The spacing 42 between the end of the packaging material periphery 34, 36 preferably moves in a range from 5 mm to 10 mm. This in the exemplary embodiment corresponds to approximately half the height 40. The spacing of the upper side of the legs 46, 48 from the lower side of the legs 28, 30 of the magnetic coil 24 is preferably at a distance from the periphery of the packaging material 10 to the optimal region 22 in such a range so as to seal the packaging material 10 such that the latter tightly encloses the products 12.

The width 46 of the recess 50 corresponds substantially to the air gap 32, thus to the mutual spacing of the two leg ends of the legs 28, 30, through which the overlapping packaging material peripheries 34, 36 are guided. The spacing 42 between the ends of the packaging material peripheries 34, 36 and the lower side 44 of the element 23 can be modified by the adjustment installation 41. A reaction to dissimilar packaging materials 10 which differ, for example, in terms of the composition, the thickness, or similar, is thus very easy. Adapting to dissimilar packaging shapes and to products 12 to be packaged can also be easily performed. The element 23, besides influencing the heating profile, also serves for guiding the packaging material 10 to be heated.

The device described is particularly suitable for sealing a packaging material 10, in particular in the case of packaging machines 8. However, the use thereof is not limited thereto.

The invention claimed is:

1. A device for sealing a packaging material (10) having packaging material peripheries (34, 36) to be sealed, the packing material peripheries (34, 36) having a polymer layer and a conductive layer, the device comprising at least one sealing installation (18) which comprises at least one coil core (24) which is surrounded by at least one coil (25) for generating a magnetic field, wherein the coil core (24) has at least one gap (32) configured to have the packaging material peripheries (34, 36) guided therethrough, the device further comprising at least one element (23) that is located and configured to conduct a magnetic flux for focusing the magnetic field onto a desired region (22) of the packaging material peripheries (34, 36) being guided through the gap (32) so as to heat and seal the packaging material peripheries (34, 36) being guided through the gap.

2. The device according to claim 1, characterized in that the element (23) at least partially surrounds the packaging material peripheries (34, 36) being guided through the gap.

3. The device according to claim 1, characterized in that the element (23) is at least partially enclosed by the coil core (24).

4. The device according to claim 1, characterized in that the element (23) is configured so as to be movable relative to the coil core (24).

5. The device according to claim 1, characterized in that the element (23) is configured so as to be U-shaped.

6. The device according to claim 1, characterized in that at least one contact pressure installation (54) which mutually compresses the two packaging material peripheries (34, 36) is provided.

7. The device according to claim 6, characterized in that the contact pressure installation (54) is contiguous to the sealing installation (18).

8. The device according to claim 1, characterized in that the device is configured for establishing a longitudinal seam in the packaging material.

9. The device according to claim 1, characterized in that the element (23) is at least partially composed of manganese and/or zinc.

10. The device according to claim 1, characterized in that the device is configured for establishing a fin seal in the packaging material.

11. A device for sealing a packaging material (10) having packaging material peripheries (34, 36) to be sealed, the device comprising at least one sealing installation (18) which comprises at least one coil core (24) which is surrounded by at least one coil (25) for generating a magnetic field, wherein the coil core (24) has at least one gap (32) configured to have the packaging material peripheries (34, 36) guided therethrough, the device further comprising at least one element (23) that is located and configured to conduct a magnetic flux for focusing the magnetic field onto a desired region (22) of the packaging material peripheries (34, 36) being guided through the gap (32) so as to heat and seal the packaging material peripheries (34, 36) being guided through the gap, characterized in that the element (23) comprises at least one recess (50) which opens towards the gap (32) and through which the packaging material peripheries (34, 36) being guided through the gap pass.

12. The device according to claim 11, characterized in that the element (23) is at least partially enclosed by the coil core (24).

13. The device according to claim 11, characterized in that the recess (50) of the element (23) is disposed so as to be aligned with the gap (32).

14. The device according to claim 11, characterized in that the element (23) is configured so as to be movable relative to the coil core (24).

15. The device according to claim 11, characterized in that the element (23) is configured so as to be U-shaped.

16. The device according to claim 11, characterized in that at least one contact pressure installation (54) which mutually compresses the two packaging material peripheries (34, 36) is provided.

17. The device according to claim 16, characterized in that the contact pressure installation (54) is contiguous to the sealing installation (18).

18. The device according to claim 11, characterized in that the device is configured for establishing a longitudinal seam in the packaging material.

19. The device according to claim 11, characterized in that the element (23) is at least partially composed of manganese and/or zinc.

20. The device according to claim 11, characterized in that the device is configured for establishing a fin seal in the packaging material.

21. A device for sealing a packaging material (10) having packaging material peripheries (34, 36) to be sealed, the device comprising at least one sealing installation (18) which comprises at least one coil core (24) which is surrounded by at least one coil (25) for generating a magnetic field, wherein the coil core (24) has at least one gap (32) configured to have the packaging material peripheries (34, 36) guided therethrough, the device further comprising at least one element (23) that is located and configured to conduct a magnetic flux for focusing the magnetic field onto a desired region (22) of the packaging material peripheries (34, 36) being guided through the gap (32) so as to heat and seal the packaging material peripheries (34, 36) being guided through the gap, characterized in that the coil core (24) has at least one interior space (31) surrounded by the coil core (24), wherein the gap (32) opens into the interior space (31), and wherein the element (23) is disposed in the interior space (31).

22. The device according to claim 21, characterized in that the element (23) at least partially surrounds the packaging material peripheries (34, 36) being guided through the gap.

23. The device according to claim 21, characterized in that the element (23) is configured so as to be movable relative to the coil core (24).

24. The device according to claim 21, characterized in that the element (23) is configured so as to be U-shaped.

25. The device according to claim 21, characterized in that at least one contact pressure installation (54) which mutually compresses the two packaging material peripheries (34, 36) is provided.

26. The device according to claim 25, characterized in that the contact pressure installation (54) is contiguous to the sealing installation (18).

27. The device according to claim 21, characterized in that the device is configured for establishing a longitudinal seam in the packaging material.

28. The device according to claim 21, characterized in that the element (23) is at least partially composed of manganese and/or zinc.

29. The device according to claim 21, characterized in that the device is configured for establishing a fin seal in the packaging material.

30. The device according to claim 21, wherein the element (23) has a recess (50) opening towards the gap (32) and wherein the recess (50) and the gap (32) have substantially equal widths.

* * * * *